United States Patent
Dowdall

(10) Patent No.: US 9,336,436 B1
(45) Date of Patent: May 10, 2016

(54) METHODS AND SYSTEMS FOR PEDESTRIAN AVOIDANCE

(71) Applicant: Google Inc., Mountain View, CA (US)

(72) Inventor: Jonathan Baldwin Dowdall, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/042,103

(22) Filed: Sep. 30, 2013

(51) Int. Cl.
*G06K 9/00* (2006.01)
*G08G 1/16* (2006.01)
*B60W 30/09* (2012.01)
*G06K 9/64* (2006.01)
*G06K 9/62* (2006.01)

(52) U.S. Cl.
CPC ............ *G06K 9/00362* (2013.01); *B60W 30/09* (2013.01); *G06K 9/00335* (2013.01); *G06K 9/00496* (2013.01); *G06K 9/6218* (2013.01); *G08G 1/166* (2013.01); *B60W 2420/52* (2013.01); *B60W 2420/62* (2013.01)

(58) Field of Classification Search
CPC .......... G06K 9/00362; G06K 9/00496; G06K 9/6218; G06K 9/00335; B60W 30/09; B60W 2420/52; B60W 2420/62; G08G 1/166
See application file for complete search history.

(56) References Cited

U.S. PATENT DOCUMENTS

| | | | |
|---|---|---|---|
| 7,321,668 B2 | 1/2008 | Horie | |
| 7,558,762 B2* | 7/2009 | Owechko et al. | 706/14 |
| 7,598,848 B2* | 10/2009 | Takagi et al. | 340/436 |
| 7,667,581 B2* | 2/2010 | Fujimoto | 340/436 |
| 7,672,514 B2* | 3/2010 | Chang et al. | 382/199 |
| 7,925,050 B2* | 4/2011 | Nagaoka et al. | 382/104 |
| 8,164,432 B2 | 4/2012 | Broggi | |
| 8,229,164 B2* | 7/2012 | Miyamoto et al. | 382/103 |
| 2002/0044674 A1* | 4/2002 | Pavlidis | G06K 9/00228 382/118 |
| 2002/0101512 A1* | 8/2002 | Klapman et al. | 348/207 |
| 2004/0183906 A1* | 9/2004 | Nagaoka et al. | 348/148 |
| 2004/0258307 A1* | 12/2004 | Viola et al. | 382/190 |
| 2005/0117779 A1* | 6/2005 | Horie et al. | 382/103 |
| 2005/0232491 A1* | 10/2005 | Chang et al. | 382/199 |
| 2007/0211919 A1* | 9/2007 | Nagaoka et al. | 382/104 |
| 2007/0222565 A1* | 9/2007 | Kawamata et al. | 340/435 |
| 2008/0019567 A1* | 1/2008 | Takagi et al. | 382/103 |
| 2008/0260207 A1* | 10/2008 | Nagaoka et al. | 382/103 |

(Continued)

OTHER PUBLICATIONS

Aoki et al., "Pedestrian Detection and Tracking in Far Infrared Images," Proceedings of the 8th International IEEE Conference on Intelligent Transportation Systems, Vienna, Austria, Sep. 13-16, 2005.*

(Continued)

*Primary Examiner* — Rami Khatib
*Assistant Examiner* — Jeffrey Boomer
(74) *Attorney, Agent, or Firm* — McDonnell Boehnen Hulbert & Berghoff LLP

(57) ABSTRACT

An autonomous vehicle configured to avoid pedestrians using hierarchical cylindrical features. An example method involves: (a) receiving, at a computing device, range data corresponding to an environment of a vehicle, and the range data comprises a plurality of data points; (b) detecting, by the computing device, one or more subsets of data points from the plurality of data points that are indicative of an upper-body region of a pedestrian, and the upper-body region may comprise parameters corresponding to one or more of a head and a chest of the pedestrian; and (c) in response to detecting the one or more subsets of data points, determining a position of the pedestrian relative to the vehicle.

16 Claims, 7 Drawing Sheets

(56) References Cited

U.S. PATENT DOCUMENTS

| | | | | |
|---|---|---|---|---|
| 2008/0260208 | A1* | 10/2008 | Nagaoka et al. | 382/104 |
| 2009/0296989 | A1* | 12/2009 | Ramesh et al. | 382/103 |
| 2010/0002908 | A1* | 1/2010 | Miyamoto et al. | 382/103 |
| 2010/0008540 | A1* | 1/2010 | Shet et al. | 382/103 |
| 2010/0253492 | A1* | 10/2010 | Seder et al. | 340/435 |
| 2011/0187899 | A1* | 8/2011 | Mitani | H04N 5/228 348/234 |
| 2011/0205042 | A1* | 8/2011 | Takemura et al. | 340/435 |
| 2011/0246156 | A1* | 10/2011 | Zecha et al. | 703/6 |
| 2011/0255741 | A1 | 10/2011 | Jung | |
| 2012/0206597 | A1* | 8/2012 | Komoto et al. | 348/135 |
| 2012/0212615 | A1* | 8/2012 | Ishii | 348/148 |
| 2013/0141574 | A1* | 6/2013 | Dalal | G06K 9/00362 348/148 |
| 2013/0293679 | A1* | 11/2013 | Gurman et al. | 348/46 |
| 2013/0329960 | A1* | 12/2013 | Sandahl | G06K 9/00791 382/104 |
| 2014/0032093 | A1* | 1/2014 | Mills | 701/301 |
| 2014/0132728 | A1* | 5/2014 | Verano et al. | 348/46 |
| 2014/0193056 | A1* | 7/2014 | Neff | 382/131 |

OTHER PUBLICATIONS

Seyfried et al., "Methods for measuring pedestrian density, flow, speed and direction with minimal scatter," Physica A 389 (2010), Available online Dec. 21, 2009.*

Schiele et al., "Pictorial Structures Revisited: People Detection and Articulated Pose Estimation," IEEE, 2009.*

Ramanan, D. "Learning to Parse Images of Articulated Bodies." Neural Info. Proc. Systems (NIPS), Dec. 2006.*

Feng et al., "Detecting Moving Target Based on Reflectivity Displacement Method and Wavelet Transform." Radar Conference, 2005 IEEE International, May 2005. p. 487-490.*

Miura et al., "Pedestrian Recognition Using High-definition LIDAR." 2011 IEEE Intelligent Vehicles Symposium (IV) Baden-Baden, Germany, Jun. 5-9, 2011.*

Schiele et al., "Pictorial Structures Revisited: People Detection and Articulated Pose Estimation." Computer Vision and Pattern Recognition, 2009. CVPR 2009. IEEE Conference on Jun. 20-25, 2009. p. 1014-1021.*

Mitzel, Close-Range Human Detection for Head-Mounted Cameras, Article, 2012, Aachen, Germany.

Sigal, Measure Locally, Reason Globally: Occlusion-sensitive Articulated Pose Estimation, Article, 2006, Providence, RI, USA.

* cited by examiner

METHODS AND SYSTEMS FOR PEDESTRIAN AVOIDANCE

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment and avoid collisions. For example, if the sensors sense that the vehicle is approaching an obstacle, the vehicle may navigate around the obstacle.

SUMMARY

Examples of systems and methods for pedestrian avoidance using hierarchical cylindrical features are described herein. In particular, a vehicle navigating a path of travel may receive information (e.g., range data) about the vehicle's environment from LIDAR and/or other types of sensors. Using the received information, a vehicle's computing system may avoid pedestrians by detecting cylindrical features that are indicative of an upper-body region of a pedestrian and maneuvering around areas where such features are detected. To do so, the computing system may analyze a 3D point cloud for data regions that are characteristic of a head region and/or chest region of a pedestrian, and perform various measurements to confirm that the regions are part of a pedestrian. Once such hierarchical cylindrical features are identified, the vehicle's computing system may adjust control strategies to avoid collisions with pedestrians and continue navigating safely.

In one aspect, a computer-implemented method involves: (a) receiving, at a computing device, range data corresponding to an environment of a vehicle, wherein the range data comprises a plurality of data points; (b) detecting, by the computing device, one or more subsets of data points from the plurality of data points that are indicative of an upper-body region of a pedestrian, wherein the upper-body region comprises parameters corresponding to one or more of a head region and a chest region of the pedestrian; and (c) in response to detecting the one or more subsets of data points, determining a position of the pedestrian relative to the vehicle.

In another aspect, a vehicle system comprises one or more sensors and a computer system. The computer system is configured to: (a) receive range data corresponding to an environment of a vehicle, wherein the range data comprises a plurality of data points; (b) detect one or more subsets of data points from the plurality of data points that are indicative of an upper-body region of a pedestrian, wherein the upper-body region comprises parameters corresponding to one or more of a head region and a chest region of the pedestrian; and (c) in response to detecting the one or more subsets of data points, determine a position of the pedestrian relative to the vehicle.

In yet another aspect, a non-transitory computer-readable medium has program instructions stored thereon that are executable by at least one processor. The program instructions comprise: (a) instructions for receiving, at a computing device, range data corresponding to an environment of a vehicle, wherein the range data comprises a plurality of data points; (b) instructions for detecting, by the computing device, one or more subsets of data points from the plurality of data points that are indicative of an upper-body region of a pedestrian, wherein the upper-body region comprises parameters corresponding to one or more of a head region and a chest region of the pedestrian; and (c) in response to detecting the one or more subsets of data points, instructions for determining a position of the pedestrian relative to the vehicle.

In still another example, a system is provided that comprises a means for receiving, at a computing device, range data corresponding to an environment of a vehicle, wherein the range data comprises a plurality of data points. The system may also comprise a means for detecting, by the computing device, one or more subsets of data points from the plurality of data points that are indicative of an upper-body region of a pedestrian, wherein the upper-body region comprises parameters corresponding to one or more of a head region and a chest region of the pedestrian. The system may further comprise a means for, in response to detecting the one or more subsets of data points, determining a position of the pedestrian relative to the vehicle.

These as well as other aspects, advantages, and alternatives, will become apparent to those of ordinary skill in the art by reading the following detailed description, with reference where appropriate to the accompanying drawings.

DETAILED DESCRIPTION

Figure 1:
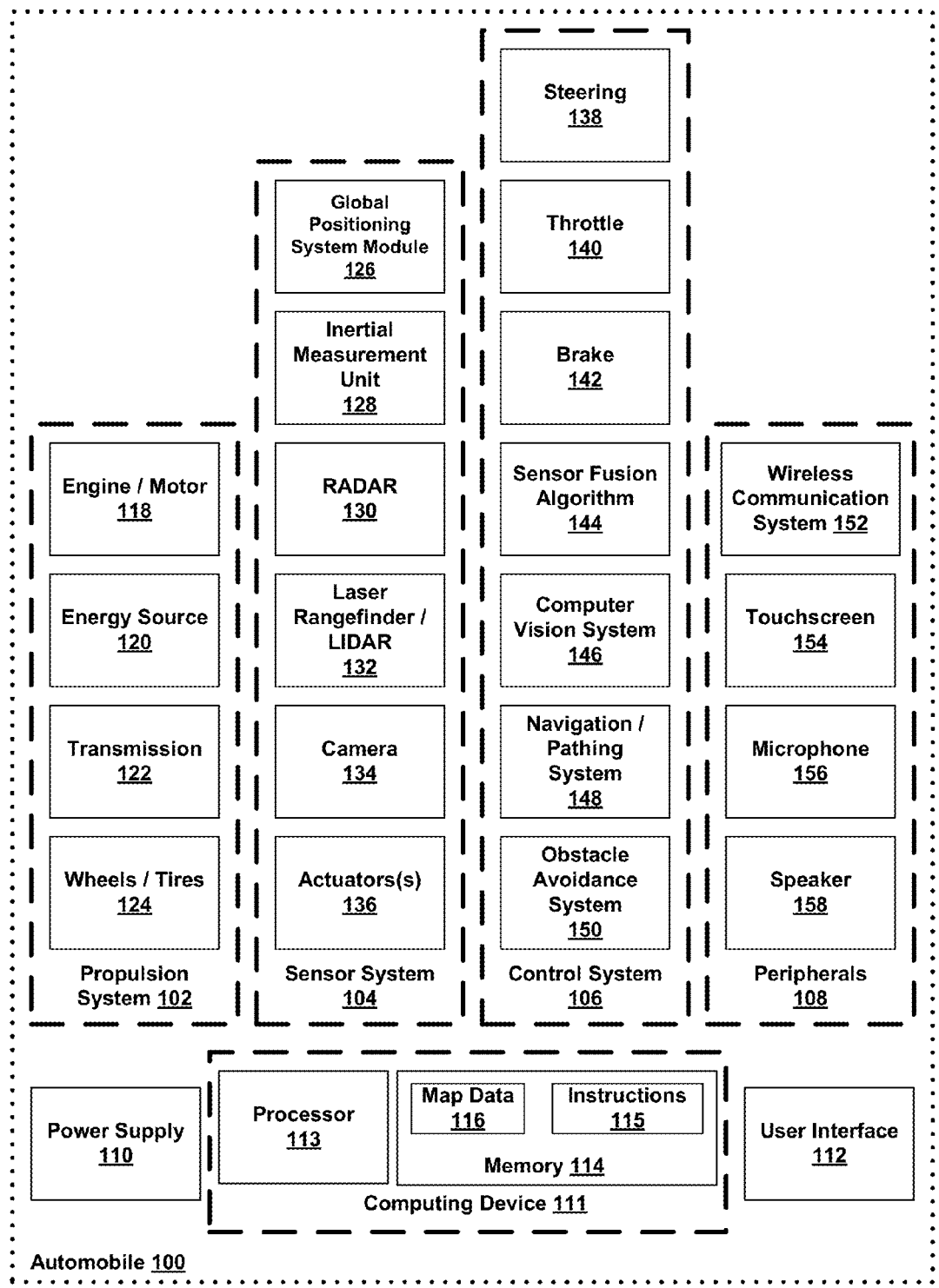
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Example embodiments may relate to an autonomous vehicle, such as a driverless automobile, that may avoid pedestrians through using hierarchical cylindrical features to detect and identify pedestrians within captured sensor data. In particular, a vehicle may detect pedestrians and/or other objects within information provided by various vehicle sensors (e.g., LIDAR) and systems through analyzing the information for features/data points possibly indicative of the upper-body regions of pedestrians. Upon identifying a possible upper-body region within LIDAR range data, a vehicle's computing system may perform various measurements in an effort to avoid false positive identification of a pedestrian. The various measurements may enable a computing system to confirm whether or not the detected data points correspond to a pedestrian in the environment. For example, the computing system may use a variety of techniques, such as measuring a center of mass, radial distance, or point density associated with the identified upper-body region to confirm that the upper-body corresponds to a pedestrian. After determining whether or not the identified data points indicative of a possible upper-body region of a pedestrian correspond to a pedestrian, the computing system may determine a position and/or orientation of the pedestrian relative to the vehicle, for example.

Further, in response to identifying pedestrians and/or other objects, the vehicle's computing system may determine adjustments to its control strategy that may be necessary to avoid the pedestrians and/or objects and provide instructions to control systems and components of the vehicle according to the adjusted control strategy. A vehicle may alter its control strategy to avoid pedestrians and/or obstacles within the vehicle's environment in real-time to ensure safe navigation, which may include navigating based on potential actions a pedestrian may make (e.g., possible movements).

To facilitate object avoidance and/or other functions, LIDAR may provide information about the vehicle's environment by illuminating the environment with lasers and measuring the reflected light. The vehicle's computing system may determine the distances and relative locations of objects using the data provided by the LIDAR unit. The measurements may be captured based on data points derived from reflections off objects in the environment. The data points make up range data, which may be used by a computing system to detect objects within the environment and/or to develop a 3D mapping of the environment.

More specifically, to detect an object that should be avoided, a vehicle's computing system may generate a 3D point cloud based on information captured by the vehicle's sensors (e.g., range data received from a LIDAR unit and/or other sensors). LIDAR and/or other sensors may capture information about objects in the environment in the form of data points, with each data point indicating a distance and angle relative to a different point in the environment. Thus, collectively, such data points may provide a 3D point cloud that is indicative of features and/or surfaces of objects in the environment (e.g., a 3D mapping of the environment). Accordingly, increasing the number of data points that are collected for an object may provide a computing system with more detailed information corresponding to the object. As described herein, the information associated with the various data points in a point cloud may also be referred to as range data. Accordingly, example embodiments may help to avoid pedestrians by analyzing a point cloud indicative of an autonomous vehicle's environment, in order to detect possible data points associated with an upper-body region of a pedestrian in the point cloud.

More specifically, in an example implementation, a vehicle's computing system may analyze the information configured within a 3D point cloud or other format for regions of interest that correspond to hierarchical cylindrical features possibly indicative of a pedestrian or multiple pedestrians. Regions of interest may include data points or may refer to surfaces that the computing system developed using clustering and some surface estimating technique, for example. The computing system may use various techniques and processes to scan the data points and/or estimated surfaces within the 3D point cloud for data points that possibly correspond to an upper-body of a pedestrian. Unlike most objects, the physical layout and relationship between a pedestrian's chest and head represents unique shapes that other objects may not likely include. Searching for a head region and chest region rather than rigid, rectangular shapes within the range data provided by LIDAR and/or other sensors may allow the vehicle's computing system to identify pedestrians from other objects within the range data.

In various implementations, the computing system may detect pedestrians within data using hierarchical cylindrical features to detect the upper-body region of a pedestrian within the 3D point cloud. An upper-body region may include a head region and/or a chest region of a pedestrian. The computing system may detect a pedestrian based on detecting the head region, chest region, or both within received information, for example. Analyzing the head region and/or chest region of the potential pedestrian, including performing possible measurements, may allow a computing system to confirm that the data correspond to a pedestrian in the environment and then determine operations to avoid the pedestrian.

In one aspect, a computing system may use a predefined pattern to assist with detecting and identify head regions and/or chest regions corresponding to pedestrians within the range data provided by vehicle sensors. The predefined pattern may be configured in such a manner that enables the computing system to detect data points that meet certain parameters, such as the spatial distances that typically exist between the head and shoulders of a pedestrian and/or the pedestrian's upper-body curvature. A computing device may eliminate data points and/or ignore data points that are not within the predefined distance that is normal for a pedestrian's head and chest. The predefined pattern may include a buffer that allows error within the data points to still determine that the data points may be indicative of a pedestrian, for example. The computing system may be configured to identify possible regions indicative of a pedestrian within data with varying degrees of flexibility/error tolerance.

After identifying one or more regions within data that possibly correspond to the upper-body regions (e.g., head and chest) of one or more pedestrians, a vehicle's computing system may compute a set of features based on the head and chest regions to further confirm whether or not the data corresponds to pedestrians. Computing a set of features based on received data possibly corresponding to a pedestrian may include the application of different processes, algorithms, measurements, software, and/or other functional standards. In one such example, the computing system may measure properties associated with the pedestrian's upper-body within data, such as center of mass of one or both of the regions, radial distances relating to the identified regions, and point densities relating to the identified regions, etc. The computing system may use LIDAR data or information received from other sensors to further detect and avoid pedestrians, including determining the various features discussed herein.

The computing device may use the various features and/or measurements to determine whether or not the identified regions within the data correspond to a pedestrian. In one example, a classifier may analyze the various features to determine if the identified regions of interest (e.g., data points) correspond to a pedestrian's upper-body. A computing system may utilize software and/or algorithms to determine if the identified regions in data correspond to pedestrians. The software and/or algorithms may utilize the various measurements that may be made based on the detected potential regions within data that may correspond to a pedestrian. Other confirmation processes may be utilized by the vehicle's computing system as well.

Moreover, a vehicle, such as an autonomous vehicle, may be configured to make additional determinations in order to avoid pedestrians within the vehicle's environment after detecting the pedestrians within the data received from the sensors. A computing device or system associated with the vehicle may use the range data and/or the determined features associated with identifying the pedestrians within data to estimate the orientation and/or position (e.g., pose) of a pedestrian. The computing system may use the pedestrian's pose and/or other information relating to the pedestrian to anticipate potential actions of the pedestrian. In addition, the computing system may acquire other factors regarding the pedestrian, such as the speed a pedestrian may be moving at or possible locations a pedestrian may be walking towards based on information received from the vehicle sensors.

For example, a vehicle's computing system may determine that a nearby pedestrian is standing on the side of a road that the vehicle is navigating along based on information received from vehicle sensors (e.g., LIDAR). Using vehicle sensors, the computing system may estimate the orientation, position, and/or other factors associated with the pedestrian in anticipation of possible actions the pedestrian may make, for example. The computing system may determine, based on the pose of the pedestrian's head and/or chest region that the pedestrian may be facing towards the middle of the road. For example, the pose may include a position and/or orientation of the pedestrian relative to the vehicle and/or other objects. The computing system may be configured to factor that the identified pedestrian may be facing towards the road according to the received data from sensors and may be more likely to enter the road than a pedestrian that may not be orientated towards the road. The computing system may give weight for analysis purposes to the fact that pedestrians typically move in a direction that involves the chest region and/or head region facing forward. Further, based on the pedestrian's positioning, the computing system may alter its navigation controls in such a manner that avoids any possible area nearby the pedestrian. Avoiding any possible areas nearby the pedestrian may allow the computing system to cause the vehicle to avoid the pedestrian safely with an additional buffer area in case the pedestrian performs some action and/or movement.

In one such example for determining possible actions of a pedestrian according to received data from sensors, a vehicle's computing system may measure the angle of the maximum radial point in the chest region of the pedestrian to determine the orientation of the pedestrian overall according to the received data. Measuring the maximum radial point may include determining the position/orientation of the pedestrian's head as shown within data. Through measuring the maximum radial point of the pedestrian, the computing system may estimate the pedestrian's possible intent and/or a group of possible actions the pedestrian may make. Other measurements and/or determinations may assist a computing system with estimating possible intentions and actions of pedestrians within the environment. Further, in order to determine the maximum radial point, a vehicle may use information received from LIDAR and/or other vehicle sensors (e.g., a camera system).

Determining possible actions of pedestrians as well as simply determining a pedestrian's position relative to the vehicle may enable a computing system to further update and/or adjust its control strategy to ensure safe navigation. The computing system may navigate in a manner that may any areas that pedestrians may likely enter and prevent any collisions from occurring by navigating safely.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, a precipitation sensor 123, an inertial measurement unit (IMU) 124, a RADAR unit 126 (radio detection and ranging), a laser rangefinder/LIDAR unit 128 (laser imaging detection and ranging), a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

Sensors in the sensor system 104 may be configured to provide data that is processed by the computer system 112 in real-time. For example, sensors may continuously update outputs to reflect an environment being sensed at or over a range of time, and continuously or as-demanded provide that updated output to the computer system 112 so that the computer system 112 can determine whether the vehicle's then current direction or speed should be modified in response to the sensed environment.

The GPS 122 may be any sensor configured to estimate a geographic location of the vehicle 100. To this end, GPS 122 may include a transceiver operable to provide information regarding the position of the vehicle 100 with respect to the Earth.

The precipitation sensor 123 may be mounted under or incorporated into a windshield of the vehicle 100. Precipitation sensors may also be mounted at various other locations, such as at or near a location of headlamps, etc. In one example, the precipitation sensor 123 may include a set of one or more infrared light-emitting diodes (LEDs) and a photodetector such as a photodiode. Light emitted by the LEDs may be reflected by the windshield back to the photodiode. The less light the photodiode receives may be indicative of the more precipitation outside of the vehicle 100. An amount of reflected light or some other indicator of the detected amount of precipitation may be passed to computer system 112.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include or be configured to be executed using, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure from Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, short-range wireless link, etc. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
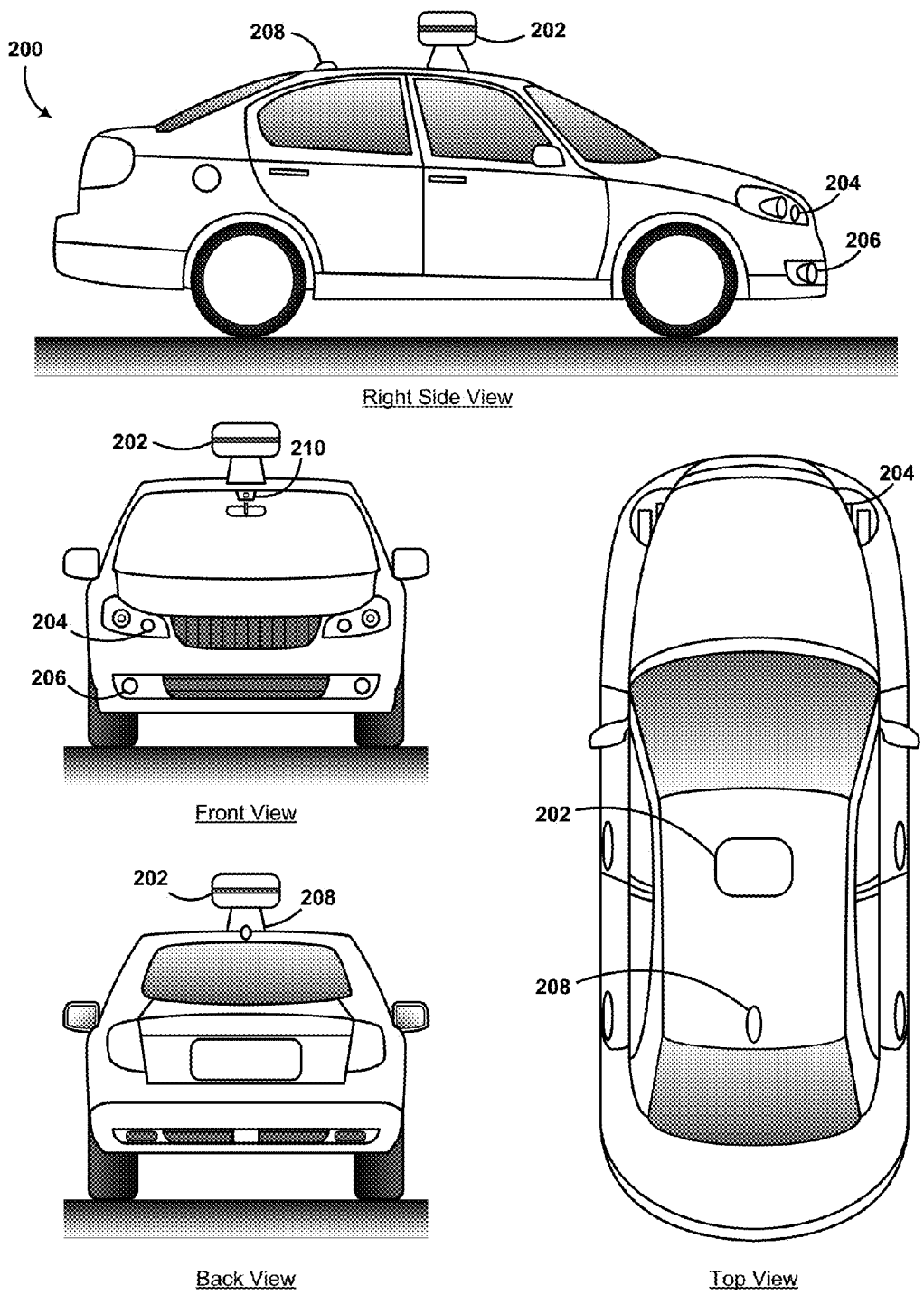
FIG. 2 shows a vehicle, according to an example embodiment.

FIG. 2 depicts an example vehicle 200 that can include all or some of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3:
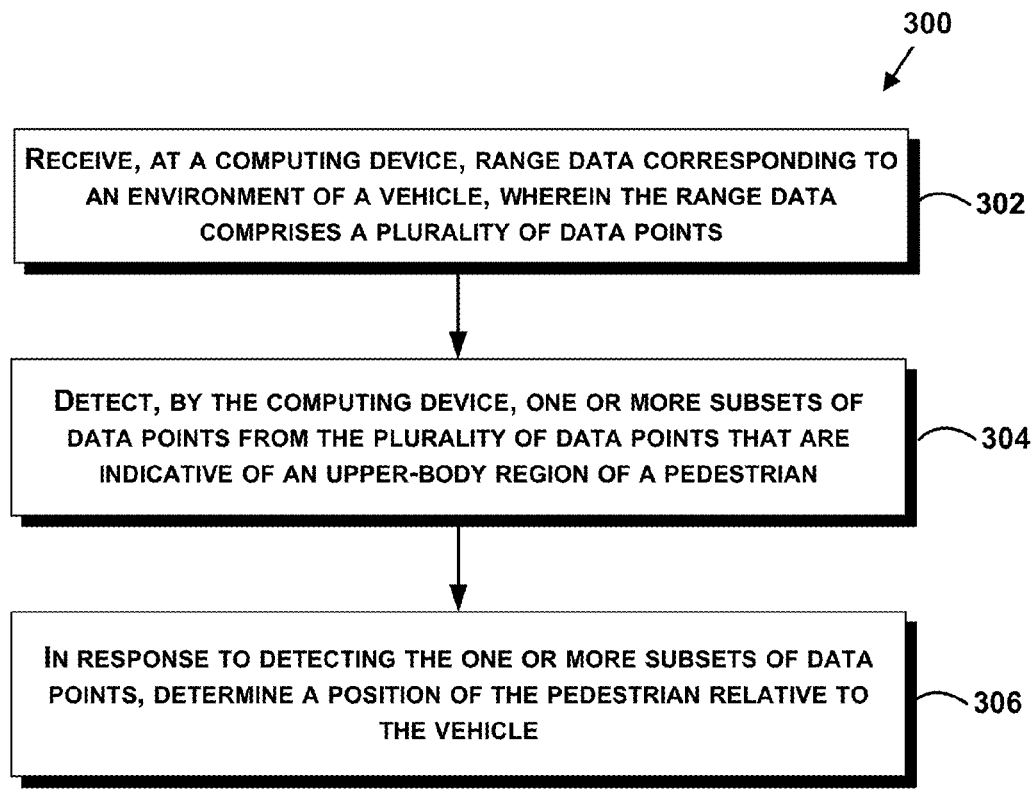
FIG. 3 is a simplified flow chart illustrating a method, according to an example embodiment.

FIG. 3 is a block diagram of an example method for avoiding pedestrians using hierarchical cylindrical features, in accordance with at least some embodiments described herein. Method 300 shown in FIG. 3 presents an embodiment of a method that, for example, could be used with the vehicle 100 and/or vehicle 200 as illustrated and described in reference to FIGS. 1 and 2, respectively, or components of the vehicle 100 or vehicle 200. For example, the processes described herein may be carried out by the RADAR unit 126, the LIDAR unit 128, other range-based sensors, or camera 130 mounted to an autonomous vehicle (e.g., vehicle 200) in communication with the computer system 112, the sensor fusion algorithm 138, and/or the computer vision system 140. Method 300 may include one or more operations, functions, or actions as illustrated by one or more of blocks 302-306. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions (e.g., machine readable code) executable by a processor for implementing specific logical functions or steps in the process. The program code may be stored on any type of computer readable medium, for example, such as a storage device including a disk or hard drive.

Further, the computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, a computer program product, or other article of manufacture, for example.

Moreover, the non-transitory computer readable medium could also be distributed among multiple data storage elements, which could be remotely located from each other. A computing device that executes some or all of the stored instructions could be a vehicle, such as the example vehicle 200 illustrated in FIG. 2. Alternatively, the computing device that executes some or all of the stored instructions could be another computing device, such as a server.

In addition, for the method 300 and other processes and methods disclosed herein, each block in FIG. 3 may represent circuitry that is wired to perform the specific logical functions in the process. Example methods, such as method 300 of FIG. 3, may be carried out in whole or in part by the vehicle and its subsystems. Accordingly, example methods could be described by way of example herein as being implemented by the vehicle. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

At block 302, the method 300 includes receiving, at a computing device, range data corresponding to an environment of a vehicle, wherein the range data comprises a plurality of data points. As an example, a vehicle may capture information about the surrounding environment using various systems and sensors. Like the example vehicles shown within FIGS. 1-2, an example vehicle performing method 300 may be equipped with various sensors, which may include LIDAR, RADAR, GPS, and/or cameras, etc. The sensors may be positioned on the vehicle at different places and/or may be connected to the vehicle through a wireless connection. Other examples of vehicles may perform the method 300 or similar methods for avoiding pedestrians. Various types of vehicles may be configured to perform method 300 and/or similar methods for avoiding pedestrians.

The vehicle sensors may capture information corresponding to the environment and the objects within the environment. For example, a camera or system of cameras may be configured to capture images of the surrounding environment. A vehicle's computing system may communicate with a GPS system to identify the vehicle's location on global coordinate scales and utilize the information to assist with navigating.

More specifically, a vehicle may use LIDAR to measure data corresponding to objects in the vehicle's environment. The measured data may allow a vehicle's computing system to detect objects within the vehicle's environment, which may allow the vehicle to navigate without causing any collisions. LIDAR may detect objects by projecting lasers into the environment and measuring the returns as reflected off objects received by sensors. The different positioning and materials of objects within the environment causes the LIDAR unit to receive a variety of information within the returns. Sensors may capture the measured data, which may come in a number of data points and may also be referred to as range data. The data points captured in reflections off objects may provide a computing system with parameters associated with the objects in the environment. In some instances, the number of data points that make up the range data may vary, which may be due to the complexity or materials of the objects within the environment. An environment that includes more objects may cause a LIDAR unit to receive range data that includes more data points, since each data point may provide information that corresponds to one of the many objects within the environment. Likewise, weather and other factors may influence the accuracy of the LIDAR unit.

As LIDAR returns are received, a vehicle's computing system may utilize the range data to develop a 3D mapping of the environment, which may include detecting objects and distances between objects and/or the vehicle. Further, the computing system may determine measurements (e.g., distances) corresponding to objects as determined by the laser returns sent and received by the vehicle's LIDAR unit or similar range-based sensor module.

A computing system analyzing received range data may determine an array of information/measurements associated with the objects within the vehicle's surrounding environment. In one illustration, the computing system may analyze range data to acquire range information relating to the environment, such as distances of the objects relative to the vehicle and/or other objects.

Similarly, the computing device may also determine relative distances between objects within the environment or other parameters relating to distances. In some instances, a computing device may make use of range data to develop a 3D mapping of the environment, which may include various distances and measurements between the vehicle, objects, and other elements within the environment.

Within examples, each data point captured by vehicle sensors may correspond to parameters associated with objects and/or the vehicle's environment in general. For example, data points may provide a computing system with information regarding an object's position, material, size, and/or other parameters. Upon receiving information from LIDAR and/or other range-based sensors, the vehicle's computing system may accumulate data points together for analysis. The computing system may generate a 3D point cloud based on the range data and/or configure the information into some other useful format. The system may analyze the range data within the 3D point cloud or other formats using a variety of techniques, which may include the use of software and/or algorithms.

In one such example, the system may cluster data points that may correspond to the same objects. Clustering may involve the computing system to group similar data points together since the data points may correspond to different features of the same object. In an example implementation, clustering may involve a computing system grouping data points based on the data points sharing some similar attribute or parameter. The computing system may cluster data points based on small distances among the cluster members, dense areas of the data space, intervals or particular features, for example. A vehicle's computing system may use any clustering technique, such as density-based clustering, for example.

In an illustrative embodiment, a point cloud may be formed by a set of data points in some coordinate system. In particular, data points within a point cloud may be organized within a 3D coordinate system, which may be defined by an X, Y, and Z coordinates, for example.

Analyzing a 3D point cloud may involve the computing system converting data points to 3D surfaces that correspond to objects within the environment. The computing system may use techniques and/or software to convert the 3D point cloud into estimated surfaces. For example, the computing system may perform Delaunay triangulation, alpha shapes, and/or ball pivoting to build a network of triangles over the existing or estimated vertices of the point cloud. In another example, the computing may use other approaches to convert the point cloud into a volumetric distance field and reconstruct the implicit surface, which may be defined through a marching cubes algorithm or other algorithms. The computing system may utilize the point cloud to generate a 3D model of the vehicle's environment.

Furthermore, a computing device or system may analyze the data points within the 3D point cloud (as data points or as determined 3D surfaces) to determine the sizes, positions, and/or orientations of objects in the environment. In some instances, the point cloud may represent other dimensions, such as two-dimensions or one-dimension. Likewise, the computing device may recognize objects within a point cloud by clustering data points that correspond to the same object and/or may also determine the materials of the object based on the reflections of the data points on the various objects.

At block 304, the method 300 includes detecting, by the computing device, one or more subsets of data points from the plurality of data points that are indicative of an upper-body region of a pedestrian. Within range data captured using LIDAR and/or other sensors, a vehicle's computing system may analyze the data points to identify regions as potentially the upper-body region of a pedestrian. An upper-body region as provided by received data may vary within examples and may include a head region, chest region, and/or other portions of a pedestrian, for example. In some instances, the computing system may analyze the range data in the form of a 3D point cloud or another format, which may be conceived as an accumulation of all the data points arranged based on a three-dimensional coordinate system.

As previously shown, a computing system may analyze a 3D point cloud or range data in other formats by converting data points to 3D surfaces that correspond to objects within the environment. After utilizing the various techniques, the computing system may have a 3D model of the vehicle's environment for objection detection purposes.

The vehicle's computing system may be configured to analyze LIDAR information to identify and analyze data points and/or estimated surfaces that may correspond to a pedestrian's upper-body region (e.g., a head region and/or chest region). Data points may provide information corresponding to parameters relating to the head region and/or chest region of a pedestrian. Likewise, the data points may further provide information corresponding to other body parts of pedestrians and/or other objects in general. The computing system may scan the estimated 3D surfaces to detect any regions of data points (e.g., sets of data points) that may correspond to a pedestrian's body, such as the head and/or chest of the pedestrian. The computing system may analyze individual data points, clusters of points, the estimated 3D surfaces, and/or other formats of information provided by LIDAR to identify pedestrians.

In some instances, the vehicle's computing system may scan the 3D cloud of received sensor information for data points and/or 3D surfaces that fit a particular mold or expected layout for a pedestrian or parts of a pedestrian (e.g., head and chest). The computing system may scan for sets of data points that correspond to surfaces that roughly match the curvature and/or shape of a pedestrian's upper-body region. The mold/designated physical structure may scan data points that match a pedestrian's head and/or chest region, or the combination of the regions in order to assist with detecting possible pedestrians within data. This serves as a means for the computing system to identify potential surfaces and/or data points that correspond to pedestrians rather than objects, since objects likely do not include the same cylindrical shapes and/or positioning as a pedestrian's upper-body. The computing system may confirm or reject potential data sets within data that may correspond to a pedestrian based on matching the curvature and/or shape of a pedestrian using software and/or other processes.

Other techniques and/or analysis may be used by a computing system for detecting hierarchal cylindrical features to assist in avoiding pedestrians. For example, the computing system may analyze the range data using a predefined pattern or predefined set of values that scans specifically for a head region and/or chest region of a pedestrian. The predefined pattern may account for the curvature and spatial distances data within the received data that may exist for a pedestrian's head and chest. For example, the computing system may ignore data points that have too much space in between them to meet the standards set forth by the predefined pattern for the distance between a head region and chest region. Through using the predefined pattern or predefined values, the computing system may identify potential regions that correspond to pedestrians and avoid improperly identifying other types of objects as potentially pedestrians. The computing system may use a pattern that detects curvature associated with shoulders and/or a head of a pedestrian in the data. The computing system may use predefined patterns that allow the computing system to identify other body parts of the pedestrian as well within received data.

While a pedestrian's head and chest region may be detected within data using hierarchical cylindrical features, other objects may likely not include the same features as therefore not display similar features in data as a pedestrian. The curvature and positioning related to a pedestrian's upper-body may not be similar to other objects. Pedestrians' head, chest, and shoulders tend to have certain measurements and curved shapes. The computing system may identify the curvature of shapes within the information provided by LIDAR and/or other sensors and use hierarchal cylindrical features to identify pedestrians within data. Thus, a computing system may locate pedestrians in range data and differentiate that data from other objects by focusing upon the hierarchical cylindrical features that make up a pedestrian's upper-body. Likewise, the computing system may search for other body portions of a pedestrian in range data as well. Furthermore, the computing system may use similar searching techniques for locating objects within range data.

In one aspect, a vehicle's computing system may estimate, based on information provided by the various data point, whether or not data points are indicative of a head region and/or chest region of a pedestrian. The computing system may analyze the 3D surface made up by clustering the points together within a 3D point cloud and determine if the 3D surface is similar to the curvature and positioning of an upper-body region of a pedestrian. The computing system may analyze the data points to determine the different materials that each data point may represent. LIDAR may detect different intensity values for different materials. For example, the computing system may be configured to analyze the points to determine if the head region's data points have intensity values indicative of skin. Skin may cause data points to have different intensity values than clothing and/or other materials that may make up other objects. A computing system may analyze the intensity values to determine if the head region has data points that may be indicative of skin, similar to a pedestrian's face.

Furthermore, a computing system may perform various measurements to confirm if the identified head region and/or chest region correspond to a pedestrian. The computing system may determine the reflectivity ratio of the data points contained within the head region and/or chest region. Using the determined reflectivity ratio of data points, the computing system may compare the received ratio to a predetermined range of reflectivity ratios that correspond to pedestrians.

Within examples, a vehicle's computing system may further determine possible intents and/or actions of identified pedestrians in order to avoid the pedestrians. To determine possible movements and intentions of a pedestrian, the computing system may analyze the positioning of the chest region relative to the head region of the pedestrian as according to the received sensor data. The computing system may determine the possible direction a pedestrian may be facing based on the positioning of the identified shoulder/chest region relative to the identified head region as shown within the data. For example, the computing system may measure the angle of the maximum radial point in the identified chest region relative to the identified head region to determine the pedestrian's possible intentions/orientation as provided by the data. The computing system may use additional sensor information to determine the orientation and/or positioning of the pedestrian.

For example, the vehicle's computing system may calculate other possible features based on the identified regions of interest in the data that may correspond to a pedestrian. In one such example, the computing system may compare the data points of the identified potential head region to the data points of the identified potential chest region to determine if the identified potential regions accurately correspond to a pedestrian in the vehicle's environment. In another such implementation, the vehicle's computing system may calculate the reflectivity ratio of the data points within the different regions (e.g., head region and chest region). The computing system may compare the reflectivity level of the different regions and determine whether or not the comparison yields results that indicate the identified regions within data correspond to a pedestrian in the environment. The computing system may factor that the intensity level of data points corresponding to a pedestrian's skin likely differ from the intensity levels of data points that correspond to other materials. Using the difference in intensity levels, the computing system may identify regions in the sensor data that may correspond to a pedestrian's skin, such as the face of the pedestrian.

In another example, a computing system may use a reflectivity ratio to confirm that the head region's data points may be indicative of the pedestrian's skin or at least partially (e.g., a pedestrian wearing a hat). The computing system may compare the reflectivity of the head region in data to the reflectivity of the chest region and/or other regions of possible interest in data. The computing system may use the reflectivity ratio to compare with prior ratios captured in data indicative of pedestrians and/or a predefined ratio range that corresponds to a pedestrian. Using the various features may allow a computing device to confirm whether or not identified regions of interest correspond to one or more pedestrians. In one such example, the computing system may determine a reflectivity ratio based on data possibly corresponding to the upper-body of a pedestrian. The computing system may use that reflectivity ratio to compare to prior reflectivity ratios that may have been determined to correspond to actual pedestrians.

In one such example scenario, the computing system may detect multiple pedestrians in the vehicle's environment by detecting multiple regions of interest within the range data that may correspond to multiple upper-body regions. The computing system may detect multiple pedestrians within the received data and confirm whether or not the points correspond to pedestrians. For example, a vehicle navigating by a park may detect and locate multiple pedestrians within the park despite being partially blocked by trees and bushes. The vehicle's computing system may identify the pedestrians by detecting the respective pedestrian's upper-body region, which allows the computing system to avoid inaccurately blending pedestrians in with other objects. Through scanning received data captured by vehicle sensors for hierarchical cylindrical features to identify regions of interest that may correspond to a pedestrian's upper-body (e.g., head and/or chest), a vehicle's computing system may detect pedestrians that may otherwise not have been identified using traditional techniques.

Furthermore, a vehicle's computing system may analyze LIDAR and/or other sensor based returns based on an intensity ratio not related to the reflectivity ratio. The computing system may use the differences in the reflections of materials (e.g., skin compared to clothing) as captured within data points to identify potential head and/or chest regions corresponding to a pedestrian. The difference in materials may allow a computing system to differentiate between a pedestrian's skin and other materials that objects may be created from. In certain portions of the near infrared spectrum, which may be used by a LIDAR unit, measuring the reflectivity ratio between the head and chest regions may serve as a discriminative feature because the skin can have a much lower reflectivity than clothing.

The computing system may measure a point density associated with possible regions that may correspond to a pedestrian's upper-body in the data received from LIDAR and/or other sensors. The computing system may determine the density of the potential head region and/or chest region, for example. Further, the computing system may use the point density for comparison reasons to confirm whether or not the data points correspond to an actual pedestrian in the environment. Likewise, the computing system may compare the point density of the identified head region to the point density of the identified chest region and determine whether or not the identified regions within received sensor data correspond to a pedestrian in the vehicle's environment.

At block 306, the method 300 includes in response to detecting the one or more subsets of data points, determine a position of the pedestrian relative to the vehicle. A vehicle may use various sensors and systems to determine a position of the pedestrian relative to the vehicle. For example, LIDAR may provide measurements regarding the position of the pedestrian relative to the vehicle.

The vehicle may utilize multiple sensors to determine a position of the pedestrian. For example, a vehicle's computing system may analyze LIDAR measurements in addition to images captured by the vehicle's camera system to determine the position of the pedestrian relative to the vehicle. Likewise, the vehicle may utilize GPS measurements to assist with determining the location and/or position of pedestrian.

In some instances, the vehicle's computing system may determine an overall pose associated with the pedestrian relative to the vehicle. For example, the computing system may analyze the orientation and position of the pedestrian relative to objects within the environment as well as relative to the vehicle. The computing system may determine a distance between the pedestrian, objects, and/or the vehicle. Further, the computing system may use the distances and other measurements to determine a possible time the vehicle may enter the area of the pedestrian, so as to avoid the pedestrian. For example, the computing system may factor the vehicle's speed, the pedestrian's speed and/or pose, and the distance between the vehicle and pedestrian to determine whether or not the vehicle needs to alter its control strategy to avoid the pedestrian. Other examples of pedestrian avoidance may exist as well.

In addition, based on the position of pedestrians and/or objects relative to the vehicle, a vehicle's computing system may determine instructions to provide to various vehicle systems and components to change or maintain its control strategy. The vehicle may alter its control strategy to avoid the pedestrian or potential areas that the pedestrian may move into. The vehicle's computing system may store the pedestrian's location within memory and/or may use the position to alter its control strategy.

Once potential pedestrians within the vehicle's environment have been located within received data, a vehicle may alter its control strategy and navigate according to the updated control strategy. The vehicle's computing system may determine the possible safest route to take in order to avoid a collision with any pedestrians. Within examples, the vehicle's computing system may adjust vehicle systems and/or execute possible control processes based on detecting and identifying objects within the vehicle's environment. Object detection, including detecting pedestrians enables a vehicle, such as an autonomous vehicle, to alter its path or take other actions to avoid collisions.

Different computing systems within a vehicle may be configured to determine control strategies for the vehicle to execute. The vehicle's computing system or systems may provide instructions to various systems and components of the vehicle in response to identifying pedestrians within the vehicle's environment.

In one example scenario, the vehicle's computing system may determine that a pedestrian or pedestrians may be located near the edge of the road. The vehicle may adjust its control strategy in order to proceed with caution. The vehicle's control systems may scan the area, including the area by the pedestrians, with more scans and/or extra attention. Unlike street signs and other immovable objects, pedestrians may cross the street at any time without substantial warning to the navigating vehicle. Thus, the computing system may cause the vehicle to slow down or stop in response to detecting pedestrians along the side of the road. Further, the computing system may raise the caution level of vehicle systems to enact prevention systems that cause the vehicle to avoid colliding with the pedestrians in the case that one or more pedestrians decides to enter the path of the vehicle.

In another example, the vehicle's computing system may provide instructions to sensing systems to focus upon movements of the pedestrians. The computing system may estimate actions that pedestrians may likely make as well as unlikely paths that may still need the vehicle to account for to avoid collisions. The computing system may take into account previously determined possible paths of movement for the pedestrian. For example, the computing system may determine that a pedestrian walking may likely continue to walk at the same rate. However, the computing system may also prepare its control strategy for other possible movements from the pedestrian, including changing speed, direction, and/or stopping.

In some implementations, a vehicle's computing system may determine a control system based on the position of the pedestrian relative to the vehicle. In addition, the computing system may also cause one or more systems of the vehicle to control the vehicle based on the control strategy. Computing devices or systems associated with a vehicle may be configured to change directions, speeds, apply brakes, or other alterations to its navigational state. A vehicle may be equipped with various systems and computing devices configured to execute control strategies, which may be capable of being altered in real-time to prevent the vehicle colliding with objects.

An autonomous vehicle may adjust its path of travel based on determining that a pedestrian and/or another type of object requires a change. The vehicle may change its control strategy and navigate around the pedestrians, creating a buffer zone that would prevent a collision even if a pedestrian moves. Other examples may exist where a vehicle may navigate around objects and/or pedestrians. The computing system may also cause a vehicle to slow down, stop, and/or speed up in response to identifying pedestrians within the vehicle's environment in range data in order to avoid the pedestrian. The computing system may change control systems and other components in response to detecting pedestrians within data.

In one aspect, a vehicle's computing system may detect pedestrians using an iterative process. The vehicle's computing system may search for pedestrians and/or other obstacles in a series of scans or analysis. The computing system may repeat any steps described herein to detect pedestrians. Similarly, the techniques described herein may be used to detect and identify other types of objects.

In another aspect, a vehicle's computing system may scan and identify pedestrians within the 3D point cloud or other formatted LIDAR information and then proceed to confirm that the detected pedestrians are actually pedestrians using hierarchical cylindrical features. For example, the computing system may estimate that an object is a pedestrian and confirm that the object is a pedestrian by detecting the pedestrian's upper-body and/or performing measurements relating to the upper-body. The computing system may perform this process using other body parts as well.

In some instances, a vehicle may include a computing system, such as a classifier, device, controller, that performs processes related to detecting pedestrians using hierarchical cylindrical features. The system may be configured as a stand-alone pedestrian detector. Similarly, the system performing processes related to detecting pedestrians using hierarchical cylindrical features may be configured as part of a classifier that analyzes the information provided by vehicle sensors. The classifier may include additional features that detect pedestrians and/or other objects. Furthermore, the classifier may be configured to improve accuracy through training and calibration. The classifier may be trained using machine learning techniques or training techniques. The system may include a network of computing devices that may assist in detecting pedestrians within a vehicle's environment.

In a further implementation, a vehicle's computing system may utilize multiple pedestrian-identification processes to detect and identify pedestrians within the vehicle's environment. For example, a computing device or system assisting with operations of a vehicle may analyze information captured by sensors using a typical object detection process. However, in the case that the computing device may not accurately identify pedestrians, the computing device may analyze the information further using hierarchical cylindrical features to accurately identify any pedestrians. In some instances, the vehicle's computing system may execute multiple pedestrian identification processes simultaneously (e.g., multiple-feature classifier).

In another example scenario, a vehicle may navigate a road that includes parked vehicles along one or both sides of the road. The vehicle's sensors may be unable to capture information relating to the full body of any pedestrians crossing the road between the parked vehicles. However, by detecting the upper-body region of any pedestrian standing along the road within data received from vehicle sensors, the vehicle may continue to navigate its path of travel after determining the position of the pedestrians in the environment.

In an example implementation, a vehicle's computing system may utilize a sliding window detector to identify regions of interest (e.g., upper-body) that may be indicative of a pedestrian. The sliding window scan may focus upon subsets of the information provided by the LIDAR. A computing system may evaluate the sliding window detector at multiple locations within the LIDAR point cloud to try and detect any pedestrians within data that may be within the vehicle's environment. Other 3D point cloud analysis techniques may be used as well.

In another aspect, a computing system may use a simple algorithm and/or software to detect pedestrians within data based on the complexity of the environment. The computing system may use a more complex algorithm, software, or multiple algorithms and/or applications to identify pedestrians within a complex environment, which may include a large number of objects and/or pedestrians.

Figure 4:
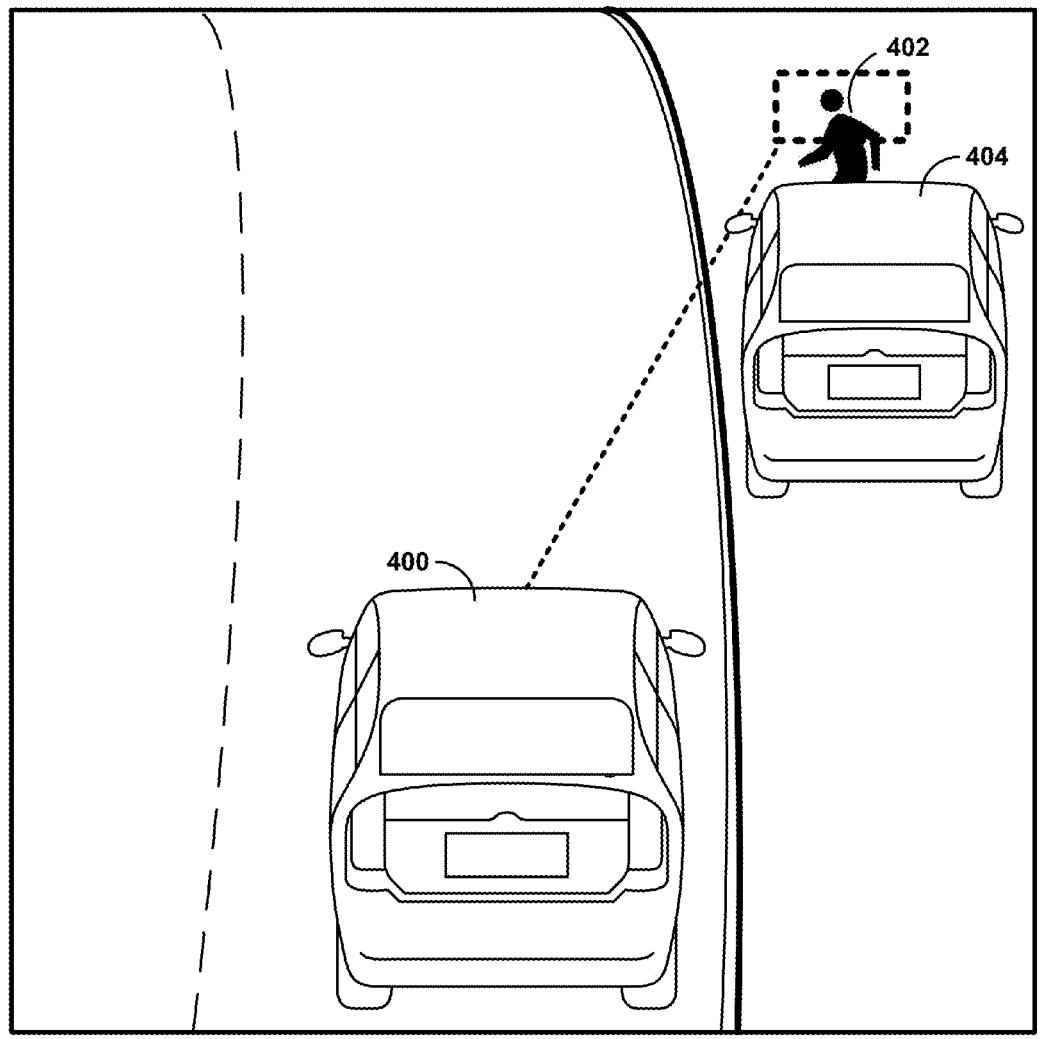
FIG. 4 illustrates an autonomous vehicle operating scenario, according to an example embodiment.

FIG. 4 illustrates an autonomous vehicle operating scenario, according to an example embodiment. Within the example shown in FIG. 4, the autonomous vehicle 400 may receive information from LIDAR and/or other vehicle sensors in order to detect and avoid pedestrian 402 standing behind a parked vehicle 404. The autonomous vehicle 400 may locate the pedestrian 402 within received data using hierarchal cylindrical features and determine a position of the pedestrian 402 relative to the vehicle 400.

Similar to the example vehicles shown in FIGS. 1-2, the autonomous vehicle 400 may include various systems and sensors configured to capture information about the environment. For example, a LIDAR attached to the autonomous vehicle 400 may capture range data corresponding to the objects within the vehicle's environment. As the vehicle 400 travel a navigational path, a computing system may analyze information received from LIDAR or other sensors. The example vehicle 400 may include other types of sensors in addition to LIDAR.

During navigation, LIDAR may provide laser returns to a vehicle's computing system associated. The information received within the laser turns may include intensity information and/or range information corresponding to objects within the vehicle's environment. In addition, the computing system may analyze the information provided by the LIDAR unit while supplementing the information provided by an elevation map to determine elevation information corresponding to the various objects within the vehicle's environment, for example.

As information is received from sensors, a computing system may configure the information into a 3D point cloud format or some other useful format for analyzing the information. In addition, the vehicle's computing system may cluster data points within the 3D point cloud to determine potential surfaces of objects and/or pedestrians within the environment. The computing system may fill in the potential surfaces using various techniques and/or processes previously discussed herein.

The computing system may utilize various processes, such as method 300, to identify pedestrians using hierarchal cylindrical features within captured range data and avoid the pedestrian as a result of determining a position of the pedestrian relative to the vehicle. The vehicle's computing system may scan information received from sensors and identify any surfaces of potential objects that may correspond to the other vehicle 404 and/or the pedestrian 402 within the received information. For example, a vehicle's computing system may use a predefined pattern that scans for hierarchical cylindrical features that correspond to a pedestrian within the received data. The computing system may detect potential regions of interest in data that may correspond to a pedestrian's upper-body and confirm whether or not the detection corresponds to a pedestrian based on measurements associated with the potential regions of interest. Upon confirming that the computing system detected a pedestrian within received sensor data, the computing system may determine a position of the pedestrian relative to the vehicle. Further, the computing system may determine a pose associated with the pedestrian, which may include an orientation of the pedestrian relative to the vehicle and/or a position of the pedestrian relative to other objects within the environment, for example.

Without detecting the head and/or chest regions of the pedestrian 402 within received range data, the vehicle's computing system may fail to differentiate the pedestrian 402 from the other vehicle 404 within the range data. The computing system may fail to identify data points unique to the pedestrian 402 and not the other 404 without analyzing the data for hierarchical cylindrical features.

Through using hierarchical cylindrical features to detect the upper-body region of the pedestrian 402 within received sensor data, the computing system may confirm that the data corresponds to pedestrian 402 located in the environment and therefore, avoid the pedestrian 402. The computing system may avoid the pedestrian even though the LIDAR sensor may not capture data points corresponding to the lower body of the pedestrian. In some instances, the computing system may detect and identify pedestrians within data by detecting a pedestrian's lower-body within range data even when the pedestrian's upper-body may be blocked by an object.

In some instances, the vehicle may use further information provided by other vehicle sensors, such as a camera or RADAR, to assist in detecting and identifying the pedestrian 402 in range data from other objects within the environment. For example, the computing system may use images in addition to LIDAR information to confirm that a detected pedestrian within data is actually a pedestrian in the environment.

The computing system may further estimate the intent and/or possible actions of the pedestrian 402. The computing system may analyze the positioning and/or orientation of the pedestrian 402 to determine if the pedestrian 402 may enter the path of the vehicle's navigation. The computing system may determine, based on measurements, possible actions that the pedestrian 402 may take. For example, the computing system may determine that the pedestrian 402 may enter the road, enter the vehicle 404, walk away for the road, remain standing still, or other possible actions. Furthermore, the computing system may factor all these possible actions or a subset of the actions into its control strategy to continue safe navigation of the road. The computing system may provide instructions to components and systems to slow down the vehicle, stop, speed up, change routes, or take other actions. Additionally, the computing system may more closely monitor the pedestrian 402 using vehicle sensors as a result of identifying the pedestrian 402 and the pedestrian's location/position relative to the vehicle 400.

Figure 5:
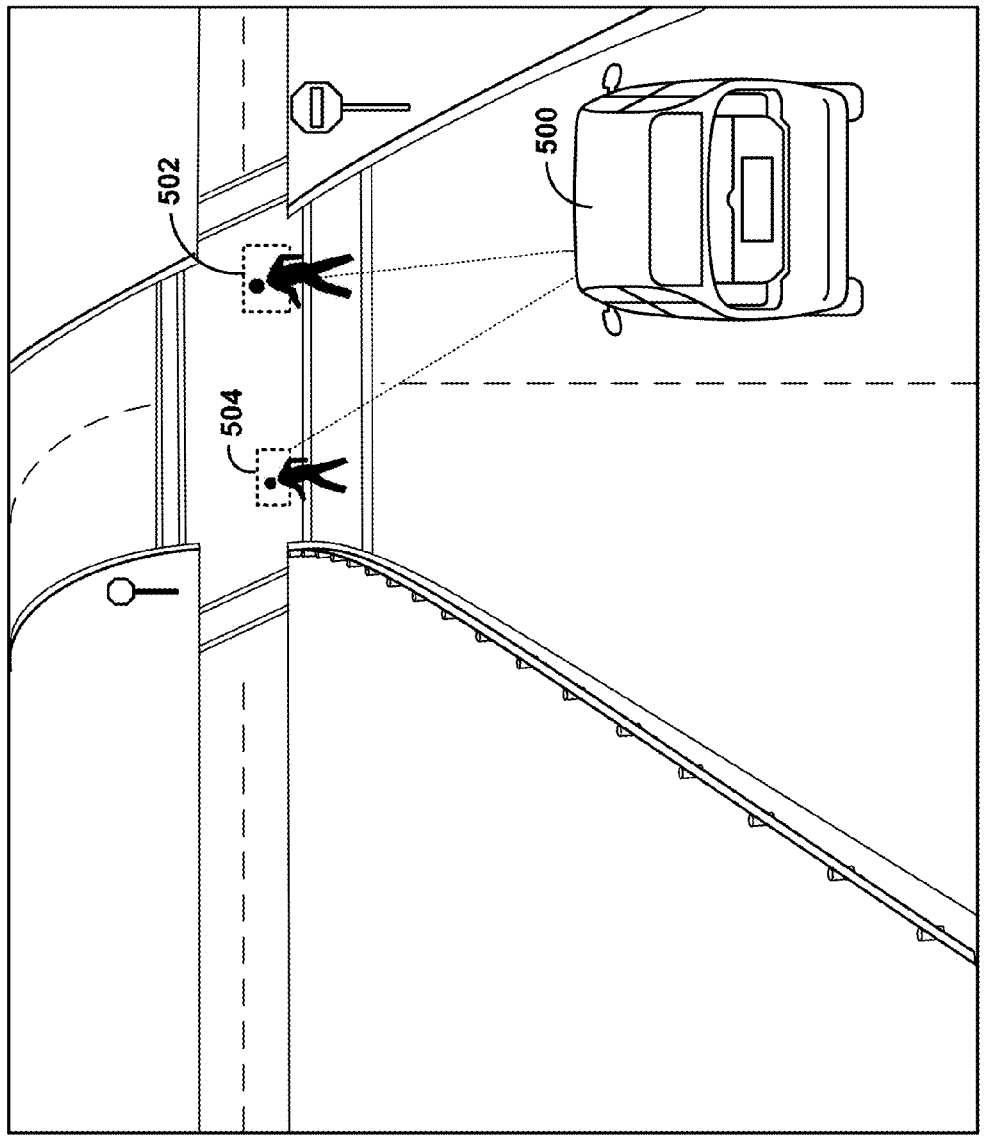
FIG. 5 illustrates another autonomous vehicle operating scenario, according to an example embodiment.

FIG. 5 illustrates another autonomous vehicle operating scenario, according to an example embodiment. Within the example shown in FIG. 5, the autonomous vehicle 500 may identify pedestrians 502-504 within information provided by vehicle sensors through detecting hierarchical cylindrical features.

Similar to the vehicles discussed in FIGS. 1-4, the autonomous vehicle 500 may be navigating down the road with assistance from LIDAR and/or other sensors providing information about the environment of the vehicle. The degree of assistance may vary within different examples. For example, the autonomous vehicle 500 may be configured to operate autonomously. In another example, the vehicle 500 may designate some tasks to a computing device or system and allow a driver to control other tasks. Other vehicles may operate base on varying degrees of computing device input and driver input.

The vehicle's 500 computing system may detect the pedestrians 502-504 crossing the road at the intersection using various sensors. For example, the computing system may analyze information captured by LIDAR and/or other sensors to detect and classify the pedestrians 502-504. In one such analysis, the computing system may detect potential regions of interest (e.g., upper-body) indicative of the pedestrian in the point cloud developed based on the sensor information. The computing system may analyze data points and determine if any of the data points may correspond to a head and/or chest region of the pedestrians 502-504.

The computing system may use a predefined pattern or other techniques to detect pedestrians within LIDAR information. The predefined pattern may allow the computing system to differentiate between pedestrians and other obstacles. Furthermore, the computing system may focus upon the pedestrians as a whole within data received from sensors and then use hierarchical cylindrical features to confirm that the detected pedestrians as actually pedestrians. The computing system may factor intensity information to detect a pedestrian's skin, which may enable a computing system to detect a pedestrian's head and/or other regions. A pedestrian's skin may provide different intensity information than other materials within the data, for example. Further, the computing system may analyze other information provided by data points to detect pedestrians within received data. The computing system may focus upon the estimated surfaces to detect a pedestrian's body within data, such as a head and/or chest of a pedestrian.

Upon detecting potential regions of interest, the computing system may confirm whether those regions correspond to a pedestrian using measurements and/or stored results indicative of previously identified pedestrians. Potential measurements may include determining a reflectivity ratio between the points within the identified head and/or chest regions of a potential pedestrian. Further, the computing system may measure the distances between the detected regions to confirm whether or not the regions correspond to a pedestrian's upper-body. The computing system may also analyze the curvature and/or positioning of the identified regions to confirm whether or not the detected regions correspond to a pedestrian.

After confirming whether or not identified regions within sensor information correspond to a pedestrian, the computing system may determine the location of the pedestrian or pedestrians 502-504. The computing system may determine a position of the pedestrians 502-504 and may further determine an orientation and/or pose of the pedestrians 502-504 relative to the vehicle and/or environment. For example, the computing system may determine the distances between the pedestrians 502-504 and the distance between each pedestrian and the vehicle. Further, the computing system may determine the distance between the pedestrians 502-504 relative to the sides of the roads, for example. Other determinations may be performed by the computing system as well.

In a further aspect, the vehicle's computing system may determine the possible intentions of one or both of the pedestrians 502-504 after identifying the positions of the pedestrians, for example. In one example implementation, the computing system may analyze the pedestrians' orientations and/or positioning to estimate possible future actions the pedestrians 502-504 may make. The computing system may determine the orientation of each pedestrian using various measurements and analysis techniques discussed herein. The measurements and/or techniques may be based on sensor data or may involve receiving additional sensor information. After determining a possible pose of the pedestrians, the vehicle 500 may slow down and/or stop as a result of detecting the pedestrians are located within the crosswalk, for example.

Further, the computing system may analyze the speed and/or past movements of the pedestrians to determine possible future actions of the pedestrians. The computing system may estimate a point that a pedestrian may be walking towards and determine the speed of the pedestrian to anticipate how the pedestrian's location may change as the pedestrian continues to walk. The computing system may determine a list of possible actions each individual pedestrian may make based on the position and/or orientation of the pedestrian in the environment. In examples, the computing system may factor other environmental elements in determining the possible list of actions.

In another example, the computing system may analyze the pedestrians' speed to determine the amount of time that the pedestrians may take to complete crossing the crosswalk. The computing system may be configured to include some margin for error (e.g., a range of locations a pedestrian may be with a 95% confidence level) and control the vehicle to maneuver around the entire area that the pedestrian may be in rather than just one estimated location. The vehicle 500 may adjust its control strategy based on possible actions and/or as a precautionary measure to prevent any possible collisions. The vehicle may navigate according its new control strategy, which may be continuously updated in real-time or incrementally updated, for example.

Figure 6:
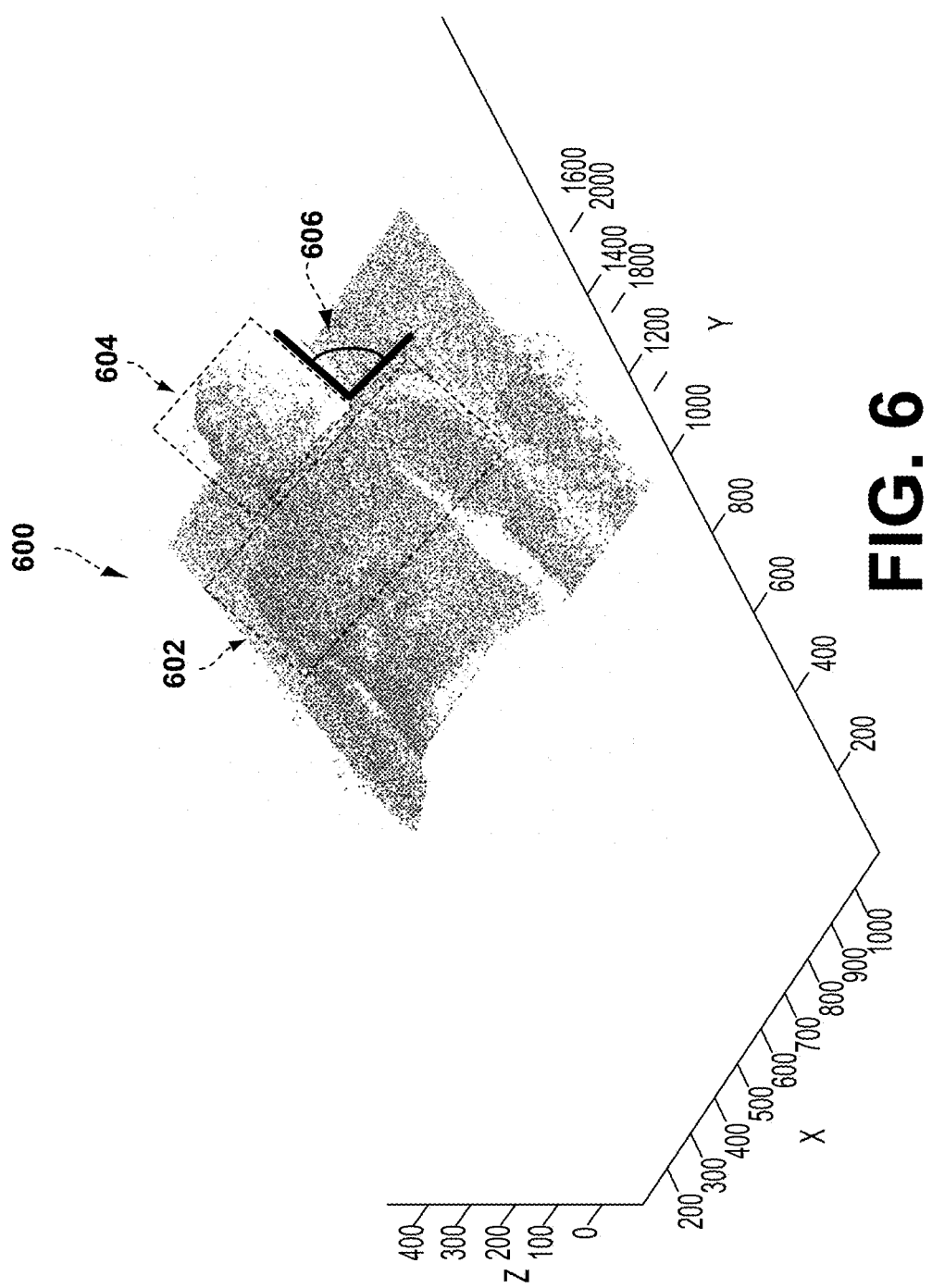
FIG. 6 illustrates an example three-dimensional point cloud displaying data points corresponding to the upper-body region of a pedestrian.

FIG. 6 illustrates an example three-dimensional point cloud displaying data points corresponding to the upper-body region of a pedestrian. As discussed in FIGS. 3-5, a vehicle's computing system may receive information corresponding to the environment from LIDAR and/or other sensors. The information may be received in the form of data points, with each data point corresponding to objects within the environment. Upon receiving the information, the computing system may format the data points into a 3D point cloud, such as the 3D point cloud 600 shown in FIG. 6. The 3D point cloud may format the data points in a manner that corresponds to the environment.

To further illustrate, the computing system may detect and identify objects within the 3D point cloud based on the positioning of the data points. The 3D point cloud 600 shows data points possibly indicative of an upper-body region corresponding to a pedestrian. A vehicle may have received information via LIDAR that resulted in a point cloud similar to the 3D point cloud 600 shown in FIG. 6.

The 3D point cloud 600 shown in FIG. 6 is based on a Cartesian coordinate system (X,Y,Z), but may be based on other coordinate systems in other examples. In addition, the scale of each axis may vary in other examples. The 3D point cloud 600 displays a large number of data points that may correspond to the upper-body of a pedestrian. A vehicle's computing system may receive the data points from LIDAR scanning the environment of the vehicle. The large number of data points that make up the possible upper-body may vary in other examples. For example, the data point cloud may contain less data points overall.

As shown within the FIG. 6, a vehicle's computing system may detect an upper-body region of a pedestrian within the data points that make up the 3D point cloud 600. The computing system may detect a chest region 602, which may include shoulders and part of the pedestrian's abdomen, for example. The chest region 602 may also display data points possibly corresponding to a pedestrian's back in other examples. The computing system may first detect the chest region 602 or may first identify the head region 604, which is also shown in the 3D data point cloud 600. In some instances, the computing system may detect data points corresponding to either the head region 604 or the chest region 602 and use further techniques to clarify which region the data points may correspond to.

In one aspect, the computing system of a vehicle may identify the data points corresponding to the head region 604 of the pedestrian using the different intensity values provided by the data points. For example, the computing system may locate the head region 604 inside a data point cloud because the data points within the head region 604 include intensity values that correspond to a pedestrian's skin (e.g., face). Likewise, the computing system may use a similar technique to identify the chest region 602 within the data points in cases that the clothing provides different intensity values or in cases that the pedestrian may not be wearing a shirt.

To confirm whether or not the identified data points within the 3D point cloud correspond to a pedestrian, the computing system may determine a point density of the data points located within the chest region 602 and/or the head region 604. The computing system may compare the determined point densities of the regions to prior point densities of similar regions found to correspond to a pedestrian. Similarly, the computing system may use the point densities of the identified regions to compare to other data points or to each other to determine whether or not the two identified regions correspond to a pedestrian within the environment of the vehicle. Confirming that the data points may correspond to a pedestrian in the environment, a vehicle's computing system may determine a position of the pedestrian relative to the vehicle. Likewise, the computing system may determine an orientation and/or position of the pedestrian relative to objects in the environment. Similarly, the computing system may perform other measurements relating to the position of the pedestrian.

In addition, the computing system may measure angles, such as radial angle 606, relating to the identified regions as shown in the data point cloud. For example, the computing system may determine an angle of maximum radial point 606 based on a position of the chest region within the data points relative to a position of the head region as shown in the 3D point cloud. Based on the angle of maximum radial point 606, the computing system may estimate an orientation of the pedestrian as the pedestrian exists in the environment. As previously discussed, the computing system may determine a potential intent of the pedestrian based on the estimated orientation of the pedestrian. Likewise, the computing system may determine a list of possible actions that the pedestrian may make.

Furthermore, a vehicle's computing system may determine a first reflectivity level of one or more subsets of data points associated with the head region 604. Likewise, the computing system may determine a second reflectivity level of one or more subsets of data points associated with the chest region 602. The computing system may use the reflectivity levels of the data points to determine whether or not the 3D point cloud corresponds to a pedestrian in the vehicle's environment. For example, the computing system may execute a comparison between the first reflectivity level and the second reflectivity level to determine whether the one or more subsets of data points within the 3D point cloud correspond to a pedestrian in the environment of the vehicle.

In another aspect, the computing system may detect data points within the 3D point cloud corresponding to a possible pedestrian using a predefined pattern. The predefined pattern may enable the computing system to identify data points arranged in a similar curvature and/or shape relating to a pedestrian's body (e.g., upper-body). The computing system may scan that system using a 3D sliding window scan or a similar technique to identify points within data that may correspond to a pedestrian in the vehicle's environment.

In another example, a vehicle's computing system may be configured to alter its control strategy based on locating and determining a pedestrian's position relative to the vehicle according to LIDAR information. The vehicle may navigate according to an updated control strategy that avoids the pedestrian.

Figure 7:
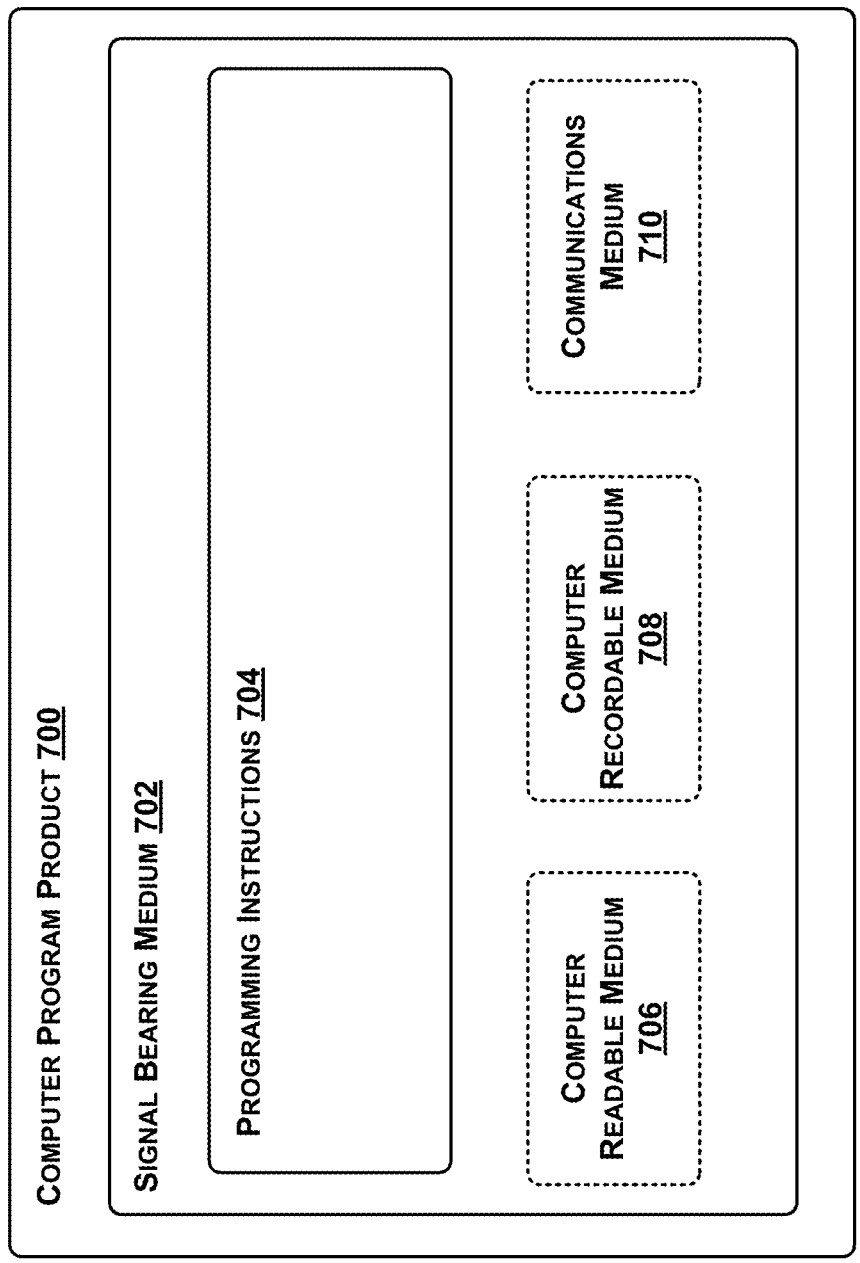
FIG. 7 is a schematic illustrating a conceptual partial view of an example computer program product that includes a computer program for executing a computer process on a computing device.

FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-4. In some examples, the signal bearing medium 702 may encompass a computer-readable medium 706, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the processor 112 of FIG. 1 may be configured to provide various operations, functions, or actions in response to the programming instructions 704 conveyed to the processor 112 by one or more of the computer readable medium 706, the computer recordable medium 708, and/or the communications medium 710.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   receiving, at a computing device from a laser-based sensor, range data corresponding to an environment of a vehicle, wherein the range data comprises a plurality of data points in a point cloud that are indicative of respective positions of one or more objects in the environment relative to the vehicle;
   detecting, by the computing device using the range data, one or more subsets of data points indicative of an upper-body region of a pedestrian from the plurality of data points in the point cloud, wherein the upper-body region comprises parameters corresponding to one or more of a head region and a chest region of the pedestrian;
   identifying, using the one or more detected subsets of data points, a reflectivity ratio based on a first intensity level of data points corresponding to the head region and a second intensity level of data points corresponding to the chest region of the pedestrian;
   determining whether the reflectivity ratio is in a range that indicates the upper-body region corresponds to a predefined reflectivity ratio range indicative of a pedestrian;
   responsive to determining that the reflectivity ratio is in the predefined reflectivity ratio range, determining a position of the pedestrian relative to the vehicle;
   based on the position of the pedestrian relative to the vehicle, determining a control strategy for the vehicle; and
   causing, by the computing device, one or more systems of the vehicle to control the vehicle based on the control strategy.

2. The method of claim 1, wherein detecting, by the computing device, the one or more subsets of data points indicative of the upper-body region of the pedestrian from the plurality of data points comprises:
   determining whether or not the one or more subsets of data points correspond to a pedestrian in the environment based on a center of mass associated with a combination of the head region and the chest region.

3. The method of claim 1, wherein detecting, by the computing device, the one or more subsets of data points indicative of the upper-body region of the pedestrian from the plurality of data points comprises:
   determining a radial distance between the head region and the chest region of the pedestrian; and
   based on the radial distance, determining whether or not the one or more subsets of data points correspond a pedestrian in the environment of the vehicle.

4. The method of claim 1, wherein detecting, by the computing device, the one or more subsets of data points indicative of the upper-body region of the pedestrian from the plurality of data points comprises:
   determining whether or not the one or more subsets of data points correspond to a pedestrian in the environment based on a measured point density of the head region and the chest region.

5. The method of claim 1, further comprising:
   determining an angle of maximum radial point based on a position of the chest region relative to a position of the head region; and
   based on the angle of maximum radial point, determining an estimated orientation of the pedestrian.

6. The method of claim 5, further comprising:
   determining a potential intent of the pedestrian to change position based on the estimated orientation of the pedestrian.

7. The method of claim 1, wherein detecting, by the computing device, the one or more subsets of data points indicative of the upper-body region of the pedestrian from the plurality of data points comprises:
   based on a predefined pattern, determining the one or more subsets of data points from the plurality of data points that are indicative of the upper-body region of the pedestrian, wherein the predefined pattern is indicative of a shape and curvature associated with the head region and chest region.

8. An autonomous-vehicle system comprising:
one or more sensors;
a computer system configured to:
receive, from a laser-based sensor, range data corresponding to an environment of a vehicle, wherein the range data comprises a plurality of data points in a point cloud that are indicative of respective positions of one or more objects in the environment relative to the vehicle;
detect, using the range data, one or more subsets of data points indicative of an upper-body region of a pedestrian from the plurality of data points in the point cloud, wherein the upper-body region comprises parameters corresponding to one or more of a head region and a chest region of the pedestrian;
identify, using the one or more detected subsets of data points, a reflectivity ratio based on a first intensity level of data points corresponding to the head region and a second intensity level of data points corresponding to the chest region of the pedestrian;
determine whether the reflectivity ratio is in a range that indicates the upper-body region corresponds to a predefined reflectivity ratio range indicative of a pedestrian;
responsive to determining that the reflectivity ratio is in the predefined reflectivity ratio range, determine a position of the pedestrian relative to the vehicle;
based on the position of the pedestrian relative to the vehicle, determine a control strategy for the vehicle; and
cause one or more systems of the vehicle to control the vehicle based on the control strategy.

9. The system of claim 8, wherein the function of detecting the one or more subsets of data points indicative of the upper-body region of the pedestrian from the plurality of data points comprises:
determining whether or not the one or more subsets of data points correspond to a pedestrian in the environment based on a center of mass associated with a combination of the head region and the chest region.

10. The system of claim 8, wherein the function of detecting the one or more subsets of data points indicative of the upper-body region of the pedestrian from the plurality of data points comprises:
determining a radial distance between the head region and the chest region of the pedestrian; and
based on the radial distance, determining whether or not the one or more subsets of data points correspond a pedestrian in the environment of the vehicle.

11. The system of claim 8, further comprising:
determining an angle of maximum radial point based on a position of the chest region relative to a position of the head region; and
based on the angle of maximum radial point, determining an estimated orientation of the pedestrian.

12. The system of claim 11, further comprising:
determining a list of possible changing position actions of the pedestrian based on the estimated orientation of the pedestrian.

13. A non-transitory computer-readable medium having program instructions stored thereon, that when executed by at least one processor, cause the at least one processor to perform functions comprising:
receiving, from a laser-based sensor, range data corresponding to an environment of a vehicle, wherein the range data comprises a plurality of data points in a point cloud that are indicative of respective positions of one or more objects in the environment;
detecting, using the range data, one or more subsets of data points indicative of an upper-body region of a pedestrian from the plurality of data points in the point cloud, wherein the upper-body region comprises parameters corresponding to one or more of a head region and a chest region of the pedestrian;
identifying, using the one or more detected subsets of data points, a reflectivity ratio based on a first intensity level of data points corresponding to the head region and a second intensity level of data points corresponding to the chest region of the pedestrian;
determining whether the reflectivity ratio is in a range that indicates the upper-body region corresponds to a predefined reflectivity ratio range indicative of a pedestrian;
responsive to determining that the reflectivity ratio is in the predefined reflectivity ratio range, determining a position of the pedestrian relative to the vehicle;
based on the position of the pedestrian relative to the vehicle, determining a control strategy for the vehicle; and
causing one or more systems of the vehicle to control the vehicle based on the control strategy.

14. The non-transitory computer-readable medium of claim 13, wherein detecting the one or more subsets of data points indicative of the upper-body region of the pedestrian from the plurality of data points comprises:
based on a predefined pattern, determining the one or more subsets of data points from the plurality of data points that are indicative of the upper-body region of the pedestrian, wherein the predefined pattern is indicative of a shape and curvature associated with the head region and chest region.

15. The non-transitory computer-readable medium of claim 13, wherein the one or more subsets of data points comprise information based on a physical structure and curvature similar to a head region and a chest region of a pedestrian.

16. The non-transitory computer-readable medium of claim 13, wherein detecting the one or more subsets of data points indicative of an upper-body region of the pedestrian from the plurality of data points comprises:
determining an angle of maximum radial point based on a position of the chest region relative to a position of the head region; and
based on the angle of maximum radial point, determining an estimated orientation of the pedestrian.

* * * * *